United States Patent Office 3,582,272
Patented June 1, 1971

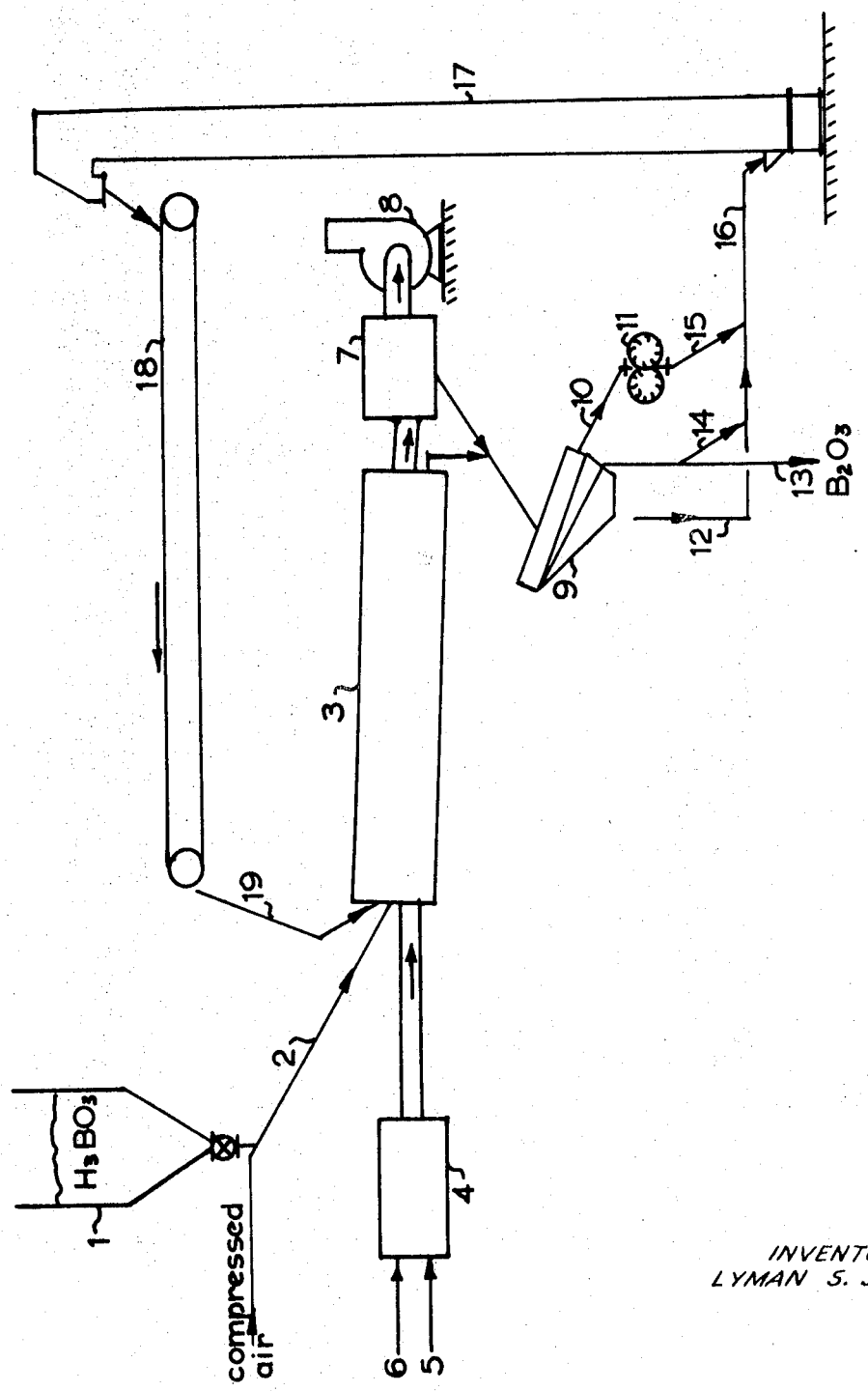

3,582,272
PROCESS FOR THE PREPARATION OF CRYSTALLINE HEXAGONAL BORIC OXIDE
Lyman S. Stanton, Martinez, Calif., assignor to Stauffer Chemical Company, New York, N.Y.
Filed July 11, 1966, Ser. No. 564,344
Int. Cl. C01b 35/00
U.S. Cl. 23—149
6 Claims

ABSTRACT OF THE DISCLOSURE

A process for the preparation of crystalline hexagonal boric oxide by first heating a mixture of at most approximately 8 to 10 weight percent boric acid or metaboric acid (Type II) in the presence of a 92 to 90 weight percent bed of crystalline hexagonal boric oxide at a temperature above the melting point of metaboric acid (Type II), and below the temperature at which the crystals of hexagonal boric oxide melt for a time sufficient to convert the boric acid or metaboric acid (Type II) to crystalline hexagonal boric oxide. The next step is agitating the heated mixture of boric acid or metaboric acid (Type II) and crystalline boric oxide bed to prevent agglomeration of the crystallizing boric oxide.

---

This invention relates to an improved process for the preparation of crystalline boric oxide. More particularly, this invention pertains to an improved process for the preparation of crystalline hexagonal boric oxide from boric acid. As used herein the term crystalline boric oxide refers to the hexagonal crystalline form of boric oxide (M.P. 470° C.).

Boric oxide of commerce has been prepared by fusing and dehydrating boric acid in a furnace with a final temperature of about 1650° F. After a melt has been obtained the boric oxide was chilled to form a glass, usually in sheets. The glass then was ground to the desired mesh size. In this prior art process a certain amount of unwanted fine material was formed which would require reprocessing by melting, recasting and regrinding.

Further, U.S. Pat. 2,137,058 describes a method for the production of crystalline boric oxide from boric acid, wherein a batchwise procedure seed crystals of boric oxide are added to a melt prepared from boric acid. The method described in U.S. 2,137,058 although it does produce crystalline boric oxide and the crystals obtained are of microscopic size, the resulting crystalline mass is a stony solid and a mechanically strong product which is somewhat resilient under blows from a hammer. The method of the prior art also suffers from long holding times that are necessary and the extreme difficulty of removing the product from the reaction vessel.

Crystalline boric oxide is a preferred material for the manufacture of many glass and enamel products over using boric acid. It is also useful as reagents in analytical chemistry and as fluxes for use in welding. It may be employed by industry to prepare elemental boron and boron alloys by reduction with active metals. Boric oxide as produced by the herein contemplated process has the additional advantage of better handling characteristics in glass and frit furnaces than fused boric oxide. Also the high cost of the fusing operation has heretofore prevented the widespread use of boric oxide.

An object of this invention is to provide a process for preparing crystalline hexagonal boric oxide.

A further object of this invention is to provide a process which can be easily adapted to a continuous process for preparing crystalline hexagonal boric oxide.

Another object of this invention is to avoid the formation of large mechanically strong crystalline masses, as obtained in prior art processes, and with increased production rate and easier to handle crystalline product.

Further objects will be apparent during the description of this invention to those skilled in the art.

Pursuant to the above-mentioned objects and yet further objects, it can be generally stated that this invention provides a process for the preparation of crystalline hexagonal boric oxide from boric acid by heating the boric acid on an agitated bed of hot crystalline boric oxide to convert the boric acid to boric oxide and to produce crystalline boric oxide therefrom. The crystalline boric oxide is then screened for sizing, the fine crystals and the oversized material after milling are recycled to the reactor to be used further as the seed bed with some recycle taken from the acceptable crystalline boric oxide.

It has been found, that in addition to using boric acid ($H_3BO_3$) as a starting material in the present invention to prepare crystalline hexagonal boric oxide, metaboric acid ($HBO_2$) (Type II) may be used as a starting material. The chemistry of removing water from boric acid is complex. An intermediate, metaboric acid, $HBO_2$, is easily formed. It exists in at least three allotropic forms; Type II has a monoclinic crystal form and melts at about 200° C. This material can be used effectively in the present invention.

In the process of the subject invention boric acid is processed to crystalline hexagonal boric oxide by heating the boric acid or metaboric acid (Type II) to a melt and then crystallizing the boric oxide from a partially dehydrated melt in contact with excess boric oxide seed crystals. The reaction may be represented

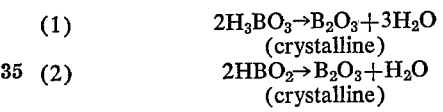

(1) $\qquad 2H_3BO_3 \rightarrow B_2O_3 + 3H_2O$
(crystalline)
(2) $\qquad 2HBO_2 \rightarrow B_2O_3 + H_2O$
(crystalline)

It has been found that as crystals form, water is expelled from the crystal lattice, much more effectively and rapidly than water lost from a melt without crystal formation.

Originally the bed of crystalline boric oxide on which the boric acid is dehydrated and recrystallized is prepared from another source for crystalline boric oxide or existing crystalline boric oxide is employed. Subsequently recycle of the crystalline material formed in the process may be used as a satisfactory seed bed. The contents of the dryer-agitator are composed of approximately 8–10% by weight of boric acid and the remainder is crystalline boric oxide. Based on boric oxide the operable ratio is 20–22:1 boric oxide to boric acid equivalent. The ratio of the seed bed of crystalline boric oxide to boric acid is at least about 10 to 1. It was found necessary and desirable to maintain the content of the liquid phase in the tumbling bed of crystalline boric oxide to at most between 8–10 percent to avoid caking and excessive agglomeration and yet be economically feasible.

The means for heating the boric acid to cause it to melt and recrystallize in the presence of an excess of boric oxide seed crystals may be any design that allows constant agitation and effective heat transfer to the boric acid and boric oxide seed bed. Therefore, there may be used a gas to solid heat exchanger, a heated surface to solid heat exchanger, and the like. A thermal disc contactor or hollow flight screw conveyor are examples of suitable surface to solid heat exchangers that provide the necessary heating and agitation for the boric oxide seed bed. The temperature of the boric oxide seed bed in the melting and crystallizing apparatus is less than the melting point of the boric oxide seed material, 860° F., and more than the melting point of metaboric acid (Type II), 390°

F. A boric oxide seed bed temperature between 400°–420° F. is most preferred.

The retention time of the boric oxide in the dryer-agitator is a function of the temperature of the dryer-agitator, and at a bed temperature of 400–420° F., a period of about 20–30 minutes has been found satisfactory.

After the boric oxide has been recrystallized on the boric oxide seed bed it is passed to a sizing apparatus where the coarse material is milled to more acceptable sizes and recycled to be used as seed bed. The fine material is recycled as seed bed. The method herein described allows for the preparation of precisely sized material. It is not necessary to screen each pass, but the particle size will increase.

The figure shows a diagrammatic flow sheet of the process. The figure shows a particular embodiment of the invention. Boric acid is charged into a feed hopper 1. A conveyor means, such as compressed air, conveys the boric acid via line 2 into the dryer-agitator 3. A heating means is provided for the dyer-agitator. Shown in the figure is a hot flue gas produced in furnace 4 by burning fuel gas 5 in air 6. Conventionally a flue gas temperature of about 480° F. is satisfactory to heat the boric oxide bed to the preferred temperature range. Other heat exchanger means have been mentioned herein and may be satisfactorily adapted to provide sufficient heat to melt and dehydrate the boric acid to boric oxide in the dryer-agitator. A deep bed of crystalline boric oxide is tumbled in the dryer-agitator 3. As the boric acid contacts this heated bed it melts, partially dehydrating, and then crystallizes to boric oxide in contact with the excess of crystalline boric oxide seed bed.

The hot crystalline boric oxide is discharged from the dryer-agitator and is collected and sized on screen 9. Any fine boric oxide blown from the dryer-agitator 3 by the hot flue gas is collected in the dust collector 7. A fan 8 pulls the flue gas through the equipment. The discharge from the dryer-agitator 3 and the dust collector 7 are combined and screened together 9. The oversize material is rejected 10 to a mill 11 where it is reduced in size. Fines are also rejected 12. A portion of the acceptable product size is drawn off as product 13. Excess crystalline product 14 is combined with the fines 12 and mill discharge 15 and fed together 16 to an elevator for recycle through the dryer-agitator. The combined sources of crystalline boric oxide are returned via elevator 17, conveyor 18 and chute 19 to dryer-agitator 3 to form the bed for further crystallization of boric oxide thereon. A recycle ratio of 10:1 will give satisfactory results. Boric acid is then supplied continuously to the heated and agitated bed of recycled crystalline boric oxide maintaining a substantially constant ratio between the boric acid and crystalline boric oxide.

The herein contemplated invention conveniently allows for the commercial dehydration of boric acid and subsequent preparation of crystalline boric oxide. The simplicity of the process allows for ease of scale-up to almost any production rate. The process is economically and commercially feasible as a continuous process or a batch process.

The dryer-agitator may be of the countercurrent type. Similarly, the dryer-agitator may be a fluidized bed that will effectively heat and agitate the contents of boric acid and boric oxide.

Other modifications in the design of the process will be apparent to those skilled in the art without departing from the scope of the invention. It is accordingly intended that the present invention shall only be limited by the scope of the appended claims.

I claim:

1. A process for the preparation of crystalline hexagonal boric oxide from $H_3BO_3$ or metaboric acid, Type II, comprising heating a mixture of $H_3BO_3$ or metaboric acid, Type II, and crystalline hexagonal boric oxide having a ratio of at least about 10 to 1 of crystalline boric oxide to the $H_3BO_3$ or metaboric acid, Type II, at temperature above the melting point of metaboric acid, Type II, and below the temperature at which the crystals of hexagonal boric oxide melt for a time sufficient to convert the $H_3BO_3$ or metaboric acid, Type II, to crystalline hexagonal boric oxide, agitating the heated mixture to prevent agglomeration.

2. The process of claim 1 wherein $H_3BO_3$ is used for the preparation of crystalline hexagonal boric oxide.

3. The process of claim 1 wherein metaboric acid, Type II, is used for the preparation of crystalline hexagonal boric oxide.

4. A continuous process for the preparation of crystalline hexagonal boric oxide from $H_3BO_3$ or metaboric acid, Type II comprising heating a mixture of at most approximately 8 to 10 weight percent $H_3BO_3$ or metaacid, Type II, in the presence of a 92 to 90 weight percent bed of crystalline hexagonal boric oxide at a temperature above the melting point of metaboric acid, Type II, and below the temperature at which the crystals of hexagonal boric oxide melt for a time sufficient to convert the $H_3BO_3$ or metaboric acid, Type II, to crystalline hexagonal boric oxide, agitating the heated mixture of $H_3BO_3$ or metaboric acid, Type II, and crystalline boric oxide bed to prevent agglomeration, supplying continuously $H_3BO_3$ or metaboric acid, Type II, to said heated and agitated bed of crystalline boric oxide maintaining the feed a substantially constant ratio between $H_3BO_3$ or metaboric acid, Type II, and crystalline boric oxide, separating by size the crystalline material discharged from said heated and agitated bed, recycling a portion of the acceptable crystalline boric oxide, the fine material and reduced oversize material to form a new crystalline boric oxide seed bed on which to form crystalline boric oxide from boric acid.

5. The continuous process according to claim 4 wherein crystalline hexagonal boric oxide is prepared from metaboric acid (Type II).

6. The continuous process according to claim 4 where crystalline hexagonal boric oxide is prepared from $H_3BO_3$.

References Cited

UNITED STATES PATENTS

| 2,137,058 | 11/1938 | McCulloch | 23—149 |
| 2,186,257 | 1/1940 | McCulloch | 23—149 |
| 3,000,705 | 9/1961 | Juckniess | 23—149X |

FOREIGN PATENTS

| 1,253,073 | 12/1960 | France | 23—149 |
| 1,119,239 | 12/1961 | Germany | 23—149 |

HERBERT T. CARTER, Primary Examiner